No. 709,883. Patented Sept. 30, 1902.
V. P. DE KNIGHT.
AUTOMATIC RAPID FIRE GUN.
(Application filed July 12, 1901.)
(No Model.) 5 Sheets—Sheet 1.
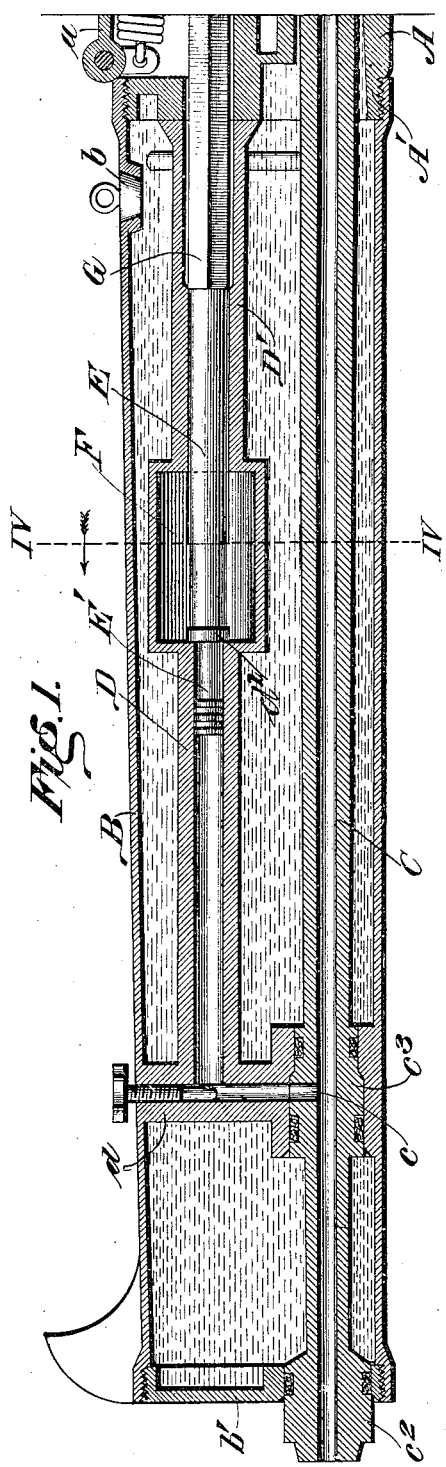
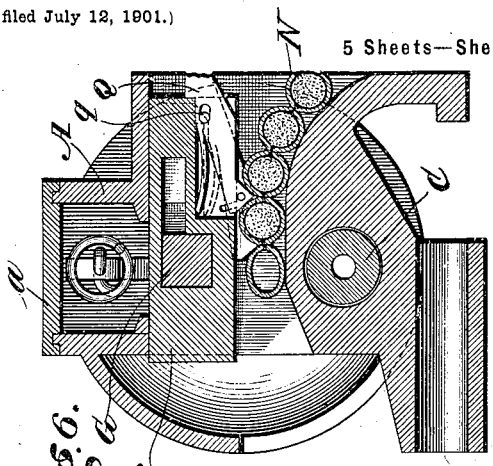
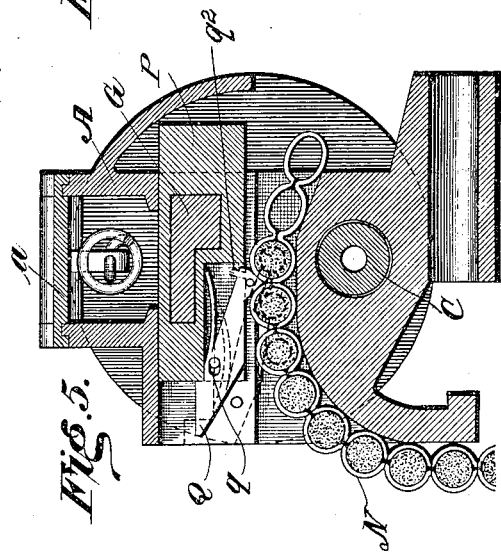
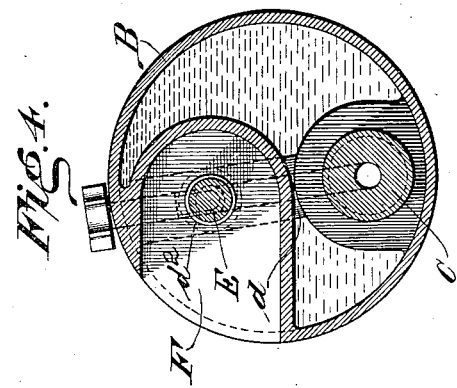
WITNESSES
INVENTOR No. 709,883. Patented Sept. 30, 1902.
V. P. DE KNIGHT.
AUTOMATIC RAPID FIRE GUN.
(Application filed July 12, 1901.)
(No Model.) 5 Sheets—Sheet 2.
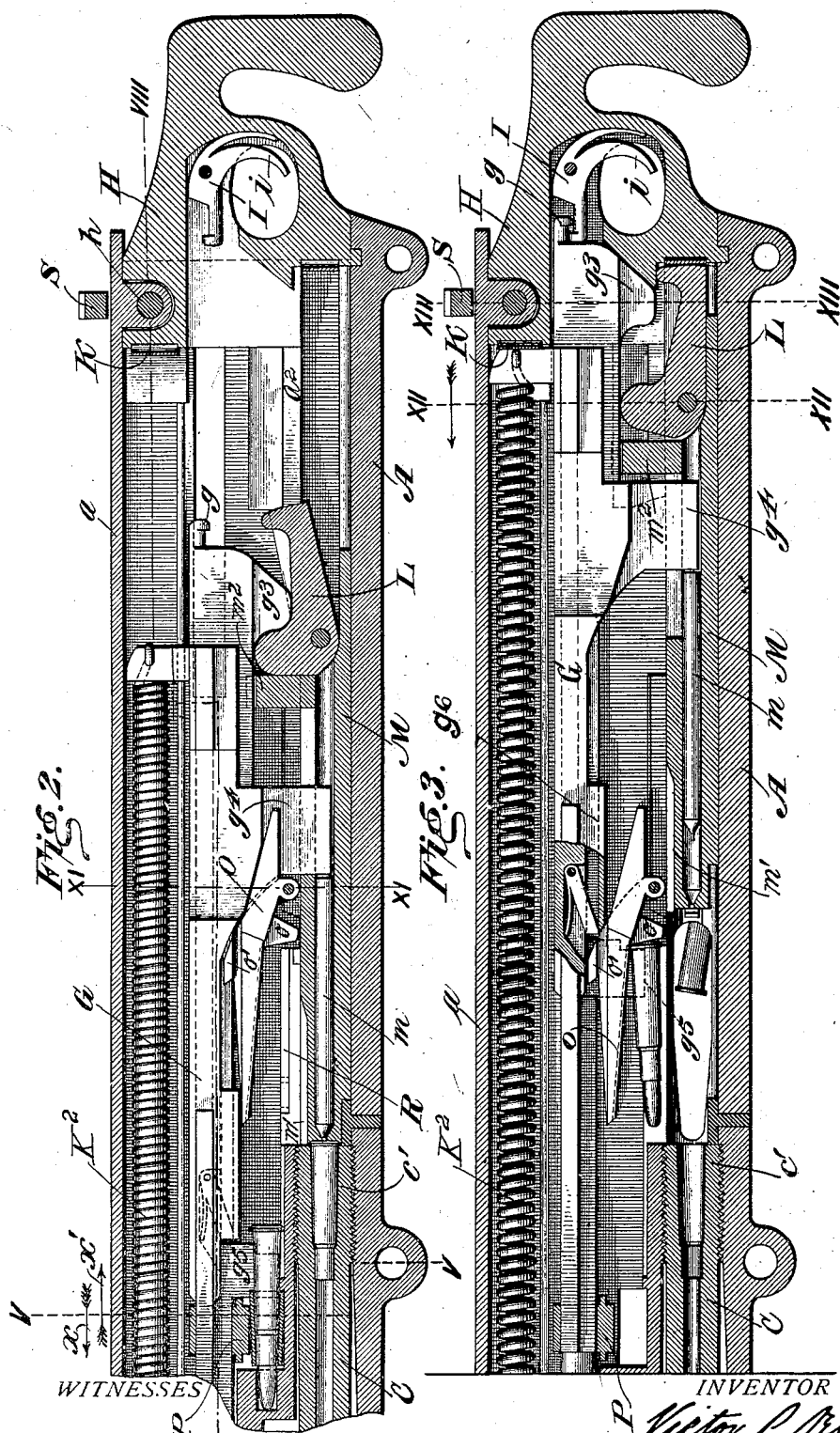

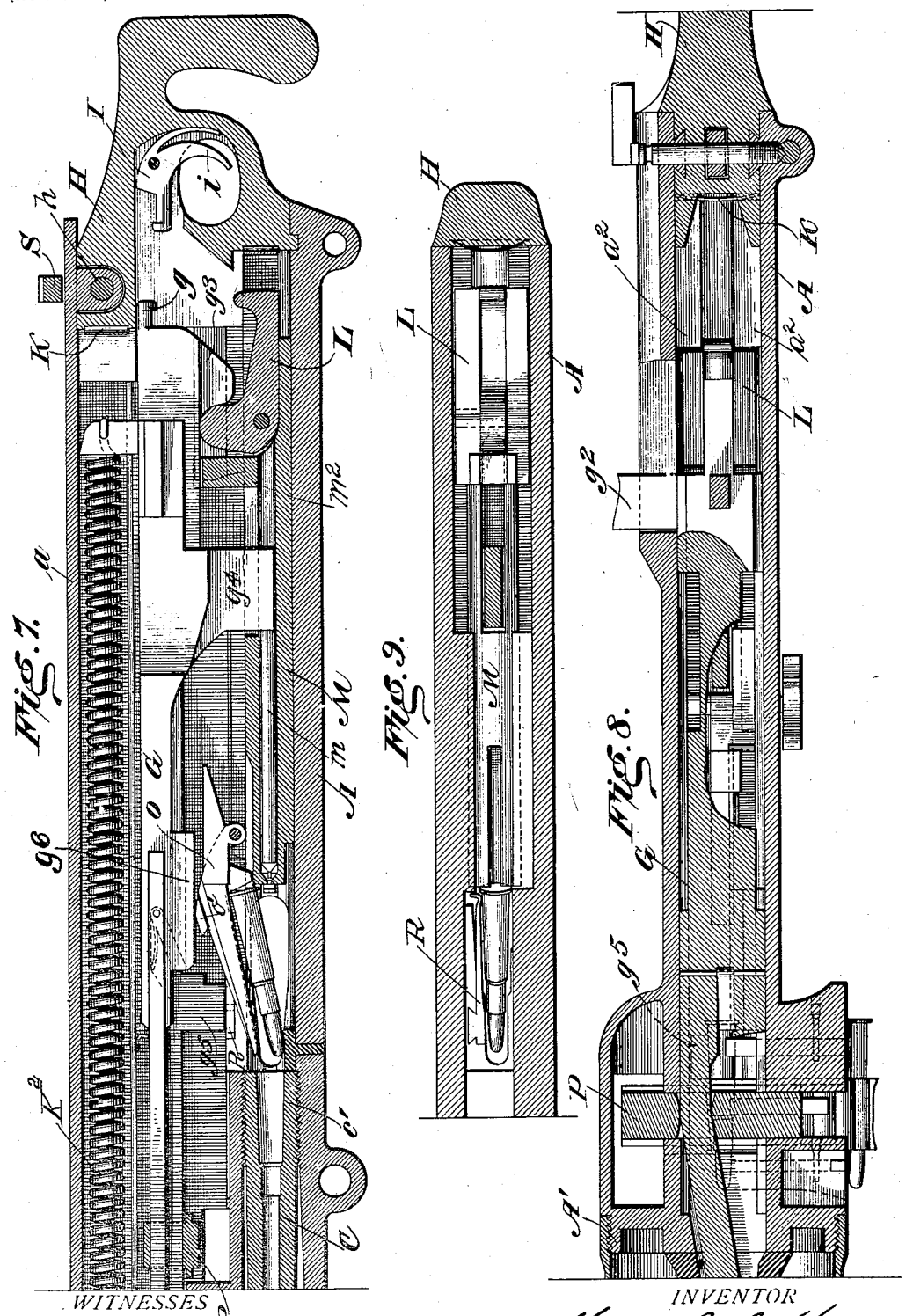

No. 709,883. Patented Sept. 30, 1902.
V. P. DE KNIGHT.
AUTOMATIC RAPID FIRE GUN.
(Application filed July 12, 1901.)
(No Model.) 5 Sheets—Sheet 4.
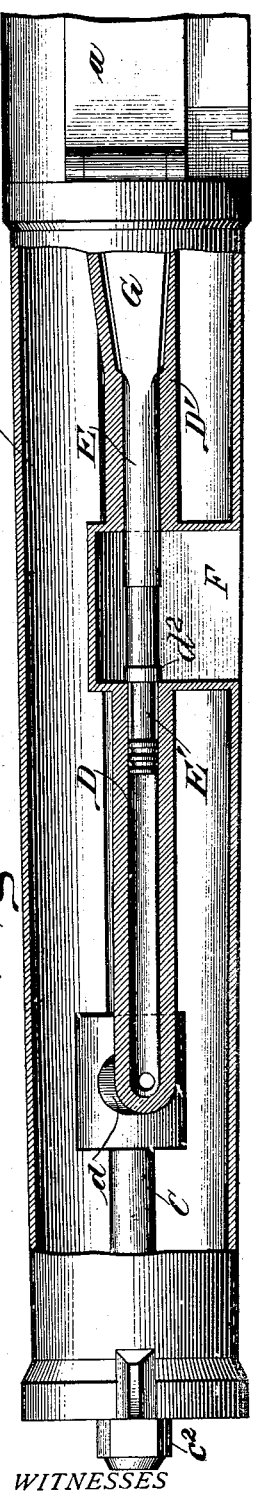
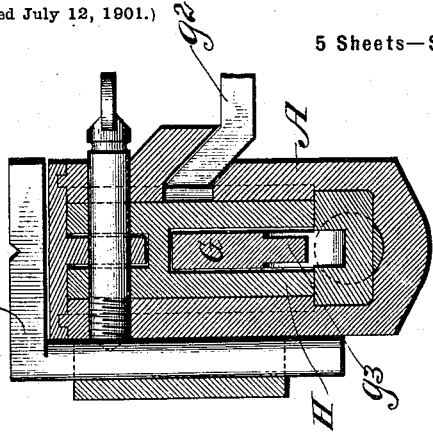
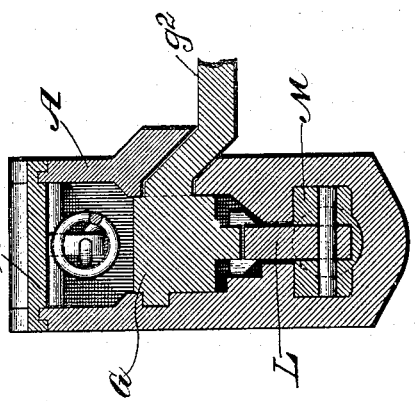
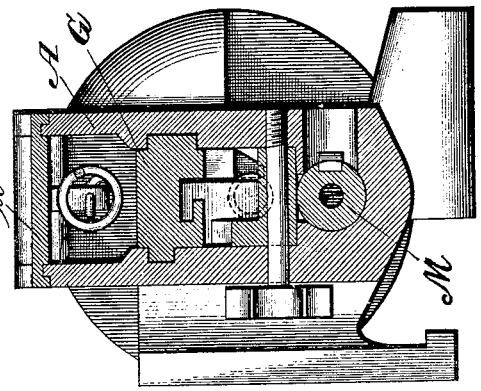
WITNESSES
INVENTOR

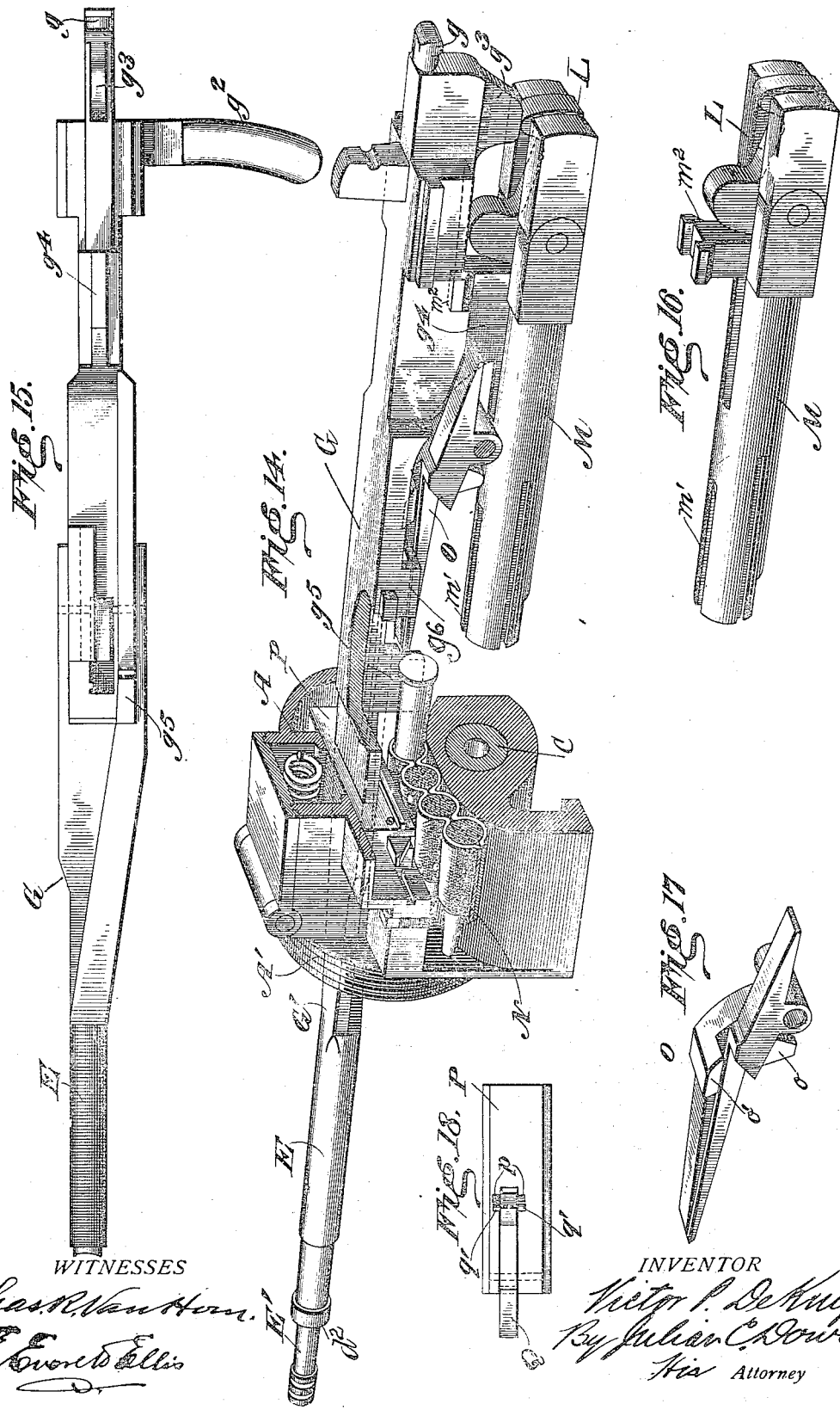

UNITED STATES PATENT OFFICE.

VICTOR P. DE KNIGHT, OF WASHINGTON, DISTRICT OF COLUMBIA, ASSIGNOR, BY DIRECT AND MESNE ASSIGNMENTS, TO THE VICTOR P. DE KNIGHT GUN COMPANY, OF WASHINGTON, DISTRICT OF COLUMBIA, A CORPORATION OF DELAWARE.

AUTOMATIC RAPID-FIRE GUN.

SPECIFICATION forming part of Letters Patent No. 709,883, dated September 30, 1902.

Application filed July 12, 1901. Serial No. 68,095. (No model.)

*To all whom it may concern:*

Be it known that I, VICTOR P. DE KNIGHT, a citizen of the United States, residing at Washington, in the District of Columbia, have invented certain new and useful Improvements in Automatic Rapid-Fire Guns; and I do hereby declare the following to be a full, clear, and exact description of the invention, such as will enable others skilled in the art to which it appertains to make and use the same.

This invention relates to breech-loading ordnance or rapid-fire machine-guns, and more particularly to gas-operated guns of the character shown and described in United States Patent No. 698,107, issued to me on April 22, 1902, and also my pending applications, Serial Nos. 29,072 and 29,854, filed, respectively, September 5, 1900, and September 12, 1900.

The principal objects of my present invention are to produce a machine-gun of the character referred to consisting of few simple parts which may be easily and cheaply constructed and assembled, to adapt the gun to be readily taken apart or its parts put together, to secure a more direct and certain action of the parts in automatically loading and firing, and generally to increase the efficiency and durability of guns of this character.

Further objects are to dispense with stuffing-boxes or analogous devices, such as are ordinarily used for securing water-tight joints between the gun-barrel and water-jacket, and at the same time to allow expansion and contraction of the metal, to dispense with complex lock and trigger mechanism, such as are ordinarily used in this class of guns, and also with the usual numerous and cumbersome details, and to make all of the connections and fastenings of simple form, so as to adapt the several parts of the gun to be readily and quickly attached and removed in assembling and taking the gun apart, the actuating mechanism being so constructed and arranged as to insure the desired operations of automatic reloading, firing, and ejecting spent cartridges either automatically or by manual operation at the will of the operator.

The invention will first be hereinafter more particularly described with reference to the accompanying drawings, which form a part of this specification, and then pointed out in the claims at the end of the description.

Referring to the drawings, in which corresponding parts in different views are denoted by the same reference-letters, Figure 1 represents a vertical longitudinal sectional view of the forward portion of a machine-gun embodying my invention. Fig. 2 is a similar view of the rear portion of the gun, showing the parts of the breech mechanism in the positions they occupy when the gun is discharged. Fig. 3 is a view similar to Fig. 2, showing the actuator and breech-block thrown back into position for depositing a cartridge in position to be inserted in the breech of the gun-barrel when the actuator and breech-block move forward. Fig. 4 is a transverse sectional view on the line IV IV of Fig. 1. Fig. 5 is a transverse sectional view on the line V V of Fig. 2 looking in the direction of the arrow denoted by the letter $x$. Fig. 6 is a transverse sectional view on the same line as Fig. 5 looking in the opposite direction, indicated by the arrow $x'$. Fig. 7 is a vertical longitudinal sectional view similar to Fig. 3, showing the actuator and cooperating parts in the act of inserting a cartridge in the breech of the gun. Fig. 8 is a horizontal sectional view on the line VIII VIII of Fig. 2, parts being broken away in order to illustrate more clearly other parts located below the broken-away portions. Fig. 9 is a detail horizontal sectional view on a plane above the breech-block. Fig. 10 is a plan view of the forward portion of the gun, showing the water-jacket and the gas-conduit in horizontal section. Fig. 11 is a transverse sectional view on the line XI XI of Fig. 2. Figs. 12 and 13 are transverse sectional views on the lines XII XII and XIII XIII, respectively, of Fig. 3. Fig. 14 is a perspective view showing the actuator, breech-block, and cartridge-feeding devices assembled in operative relation to each other in the position said parts assume when the breech-block is unlocked and about to be thrown back by the actuator, also showing a fragment of the receiver or cradle carrying the cartridge-feeding devices. Fig. 15 represents an inverted plan view of the actuator, its reduced terminal or piston proper carried thereby being broken off. Fig. 16 represents a detail perspective view of the breech-block detached. Fig. 17 is a perspective view of the cartridge-depressor, and Fig. 18 is a detail inverted plan view of the cartridge-feed slide.

In its general features and mode of operation the gun herein shown and described is very similar to the gun illustrated and described in my above-mentioned pending application, Serial No. 29,854. Hence it is not deemed necessary to give a detailed description herein of such parts as are common to both applications. As will be seen, the operating parts of the gun have been considerably reduced in number and the general arrangement and construction of other parts simplified and still others dispensed with, with a view to increasing the efficiency and durability of the apparatus.

The gun may be supported upon a tripod or other suitable support, (not shown,) such as is common in this class of ordnance, and provided with the usual appliances for changing its elevation or inclination at will. As shown, the automatic cartridge feeding, loading, firing, and shell-ejecting mechanisms are inclosed within a receiver or cradle A in the form of an elongated trough-like body having an open top provided with a suitably-hinged cover $a$ to afford easy access to the interior thereof. Detachably secured to the front of the receiver is a water-jacket B, containing the gun-barrel C and gas-conduit and piston-cylinder D, said jacket being provided with a suitably-located water orifice or inlet, which may be closed by a removable stopper, as at $b$. The receiver or cradle may be of any suitable construction, but is preferably of the form shown, the cover $a$ being preferably hinged at the forward end and detachably connected at the other end with the wedge-block H. The rear end of the water-jacket is interiorly screw-threaded and screwed upon an exteriorly-threaded boss or projection A' at the front end of the receiver, and the front end of said jacket is similarly screw-threaded to receive the closing-piece or cap $b'$, having an opening therethrough for the insertion of the gun-barrel, as shown. In the construction illustrated the gas-conduit and piston-cylinder D is formed integrally with the water-jacket and is provided at its forward portion with a hollow post or coupling $d$, having a lower sleeve or socket through which the gun-barrel is passed. The bore of said post or coupling registers with a lateral gas-exit $c$ in the gun-barrel. The barrel C has its breech end $c'$ screwed into an opening therefor in the receiver and is preferably somewhat enlarged at its muzzle end $c^2$ and intermediate portion $c^3$ and adapted to fit a correspondingly-shaped opening in the cap $b'$ and the correspondingly-formed lower sleeve or socket of the post $d$ of the gas-conduit, said enlarged portions being annularly grooved to receive suitable packing, as shown, in order to form a water-tight joint between the gun-barrel and the interior of the water-jacket and permit the expansion and contraction of the metal due to variations of temperature without causing leakage. As shown, the intermediate enlarged portion $c^3$ is of smaller diameter than the forward enlarged portion $c^2$, and the screw-threaded breech end $c'$ is still smaller to facilitate insertion or withdrawal of the gun-barrel. In the gas-conduit and cylinder D is fitted the piston E' on the forward portion of the actuator G, having an annular shoulder $d^2$ thereon formed, covering the rear open end of the cylinder when the actuator is in its foremost position. The hollow post $d$, forming an inlet from the barrel to the gas-conduit, is provided with a plug or "choker" in the form of a set-screw entering the opening therethrough, whereby said opening may be reduced or enlarged at pleasure to regulate the volume of gas acting upon the plunger or piston. To provide for the escape of burned powder and gases, the water-jacket is preferably formed with a recess or concavity F, Fig. 4, forming an outlet into the open air at a point just in rear of the reduced terminal or piston E' on the forward end of the actuator G, said recess being of sufficient dimensions to afford free access to the open air for the expulsion of spent gases and to facilitate the circulation of air in order to keep the reciprocating plunger and actuator cool. The reduced terminal E' of the actuator, forming the piston proper, is slidingly fitted within the cylinder or gas-conduit D, while an adjoining portion E, preferably of larger diameter and integral therewith, works within a rearward extension D' of the cylinder to hold in proper alinement and steady and guide the piston end of the actuator during forward and backward movement. That portion of the combined gas-conduit and cylinder back of the piston proper is preferably constructed for a portion of its length in cylindrical form and somewhat enlarged the remainder of its length.

The wedge-block H, closing the rear end of the receiver, may be detachably connected therewith by means of dovetailed grooves in opposite sides thereof engaging correspondingly-shaped vertical ribs on the inner walls of the receiver, or vice versa, to adapt the wedge-block to be readily detached, and a bolt $h$, passing through apertures in the wedge-block and in the receiver and also through a lug depending from the cover, secures said parts together. The rear end of the wedge-block is provided with a handle or grip, and it is interiorly recessed to receive a pivoted spring-pressed catch-piece or trigger I, adapted to engage a hook-like projection $g$ on the rear end of the actuator when the latter is thrown back to its rearmost position, as shown in Fig. 3, and retain the actuator in the latter position until released by pressure upon the finger-piece $i$ of the trigger. To cushion the actuator and connected parts on the backward movement thereof, I may employ a flat or leaf spring K, Figs. 2, 3, 7, and 8, or other suitable device, and the breech-block may also be similarly cushioned, as at K'. The actuator may be conveniently braced and guided in its reciprocatory movements by lateral ribs or projections thereon engaging longitudinal grooves in the inner walls of the receiver, or vice versa, as shown in Figs. 11 and 12, or in any convenient manner.

The combined slide-bar or actuator and piston or plunger constitutes the principal member of the gas-impelled structure, which is impelled backwardly at each discharge of the gun by the generated gases acting upon the piston E against the action of the coiled spring $K^2$ or other suitable power-storing device by which the actuator is impelled forwardly. The actuator is thus reciprocated at each discharge of the gun, so as to effect the reloading and firing automatically. The said bar G is provided with a pull-piece or handle $g^2$, which extends laterally through an elongated slot in the side of the receiver for operating said bar by hand in the initial loading. Said bar G is also provided at the rear thereof with a cam-faced lug or projection $g^3$, adapted to engage the locking-dog L, carried by the breech-block M, for the purpose of locking and releasing said breech-block at the proper time in its forward and backward movements. It is also provided with a lug or projection $g^4$, which in the form shown enters a slot in the breech-block M behind the firing-pin $m$ and is so arranged that it will strike the shank or stem of the hammer or firing-pin the instant after the breech-block has been locked in firing position, as shown in Fig. 2, thus exploding the cartridge. Forward of the projection $g^4$ another projection $g^5$ is provided upon the bar G, so arranged that when the actuator is moved forward its full limit said projection will stand forward of the cartridge in the feed-throat lying next thereto, so as to cause the flange thereof to be engaged by said projection on the backward movement of the actuator, whereby such cartridge will be withdrawn from the belt and carried back underneath the rocking cartridge-depressing lever O, to be deposited in position for insertion in the breech of the barrel when the breech-block is moved forward.

The cartridges are fed to the gun in a belt N, to each side of which they project to a considerable extent, said belt passing transversely through the receiver in a passage-way formed over the rear portion of the gun-barrel, as shown. Suitable openings are provided in the receiver for the entrance and exit of the cartridge-containing and empty portions of the belt, respectively, said belt being arranged to enter the passage therefor over a rounded or curved projection on that side of the receiver as shown in Fig. 14 and being adapted to be advanced by the engagement therewith of a feed-dog Q, carried by the feed-slide P, which is moved forward and back by the reciprocating bar G, said bar having, preferably, an angular portion which extends through a correspondingly-shaped slot in the feed-slide (see Figs. 5, 6, 8, and 14) and by a cam-like action operates to move the feed-slide forward and back each time the said bar is reciprocated. Other means may be employed for effecting this movement. The feed-dog or pawl Q may be either spring-pressed or weighted to cause it when the slide moves forward to engage the belt just back of a pocket containing a cartridge and shove the cartridge into position to have its flanged head engaged by the projection $g^5$ on the actuator when the latter begins its return movement, said feed-dog being adapted to rise or be rocked upon its pivot and slip past the cartridge next to be advanced on the backward or reverse movement of the feed-slide. Backward movement of the cartridge-belt during outward movement of the feed-slide may be prevented by weighted or spring-pressed pawls arranged to stand behind the cartridge next to the one being extracted, as indicated in Figs. 5, 6, and 8, the latter pawls engaging the cartridge ends, one on either side of the single pawl Q. The pawl Q engages the belt directly behind and between the ends (preferably about midway) of the cartridge which is next to be extracted. Said pawl or feed-dog Q is so attached that when the feed-slide moves forward the pawl will be locked in engagement with the belt or cartridge to prevent the pawl from becoming disengaged and riding over or past the cartridge, while on the return or backward movement the engaging end of the pawl will be free to rise and slip past the next cartridge in the series in position to engage the latter cartridge on the forward movement of the slide. This movement is conveniently effected by slightly elongating the aperture $q$ in the pawl, which receives the pivot-pin thereof, and providing the engaging end of the pawl with a stud or studs $q'$, Fig. 18, adapted to take under the slide on its forward movement and enter a groove or slot $q^2$ underneath the slide, Fig. 5, when the latter recedes or moves backward. A limited movement of the slide in a backward direction is thus allowed before disengaging the pawl, while the pawl is permitted to slip back as the slide begins to move forward, thereby causing the stud on the engaging end of the pawl to slip out of the slot $q^2$ and under the slide or a shoulder at the base of said slot and lock the pawl as the slide continues its forward movement. A rearward extension or finger-piece on the pawl is preferably provided to permit it to be raised to allow a cartridge to drop back in case two cartridges are simultaneously fed into the throat of the passage-way for the cartridge-belt. By the described arrangement of feed-dog and retaining dogs or pawls a very short feed-slide may be used.

When the projection $g^5$ on the actuator engages the flange of a cartridge that has been advanced into engaging position by the feed-slide, the cartridge will be moved backward and underneath the inclined arm of the cartridge-depressor O by reason of its confinement between said projection and the opposite wall of the cartridge-passage, as shown in Fig. 9, and to facilitate such action and prevent the flanged end of the cartridge from prematurely falling down or being thrown out of proper alinement I provide a spring R, Figs. 2, 7, 8, and 9, which is located at one side of the cartridge passage or channel, with one end thereof adapted to press the cartridge lightly against the opposite wall of the passage and maintain it in proper position while it is being carried back under the depressor.

The depressor O differs somewhat from the depressor shown in the aforesaid application in having an L-shaped lug or projection $o'$, adapted to enter a correspondingly-shaped groove in the actuator, when the latter is moving rearwardly, whereby the depressor is maintained in its normal horizontal position until such parts are disengaged. The depressor is rocked on its pivot or positioned to receive a cartridge, as shown in Fig. 2, by the action of the breech-block, which in moving forward contacts with a lug $o$ forward of the pivot of the depressor, said lug preferably entering a guide-groove $m'$ in the breech-block, having an inclined surface along which the lug moves until it has raised the depressor to the desired position. This position will be maintained by continued contact between the lug and the plane surface of the breech-block until the latter has moved backward on its return movement far enough to cause the lug to clear the inclined or cam surface of the breech-block, after which the same position of the depressor will be maintained by the actuator until the latter has moved far enough back to carry the cartridge into position to be depressed and pointed for insertion in the cartridge-chamber. Thereupon the lug or projection $o'$ on the depressor will be engaged by a lower elongated projection $g^6$ of the actuator and thrown into the position shown in Fig. 7, so as to point and direct the cartridge into the breech of the barrel, to be inserted therein by the action of the breech-block in the manner described in my former applications and as will be understood from the accompanying drawings, the latter position of the arm being maintained by the actuator, as shown, until the arm $o'$ has cleared the said elongated projection. Thereupon the actuator under the tension of the spring $K^2$ being free to move forward by pressure on the finger-piece of the catch or trigger I will advance, carrying with it the breech-block, which will push the cartridge into the breech of the barrel and raise or position the depressor to receive another cartridge, which position will be positively maintained by the actuator for the desired period of time by the entering of the head of the L-shaped lug $o'$ of the depressor in the correspondingly-shaped slot of the actuator formed, preferably, through the elongated projection $g^6$, as shown in Figs. 2 and 11. As will be seen, instead of a T-shaped slot and correspondingly-shaped arm or cross-head on the depressor, as in my former application of September 12, 1900, I show herein an L-shaped construction for the same purpose and dispense with one lug on the depressor and actuating-cam surface on the breech-block by causing the actuator to trip the depressor instead of tripping it by the action of the breech-block, thus simplifying the construction and reducing the number of parts. It will be understood, of course, that the cam-surfaces on the breech-block and actuator for contact with the depressor will have such slant or inclination as may be necessary to prevent too sudden or violent action and consequent injury to the parts, while at the same time adapted to insure positive and accurate action in raising and lowering or positioning the depressor for either receiving a cartridge under its inclined arm or directing and pointing the cartridge for the action of the breech-block. The breech-block carries an upstanding arm $m^2$, having a forked or bifurcated extremity embracing the actuator from below to prevent rotary movement of the breech-block and provide an abutment for the bell-crank-shaped locking-dog L, pivoted thereto in position to be engaged by the cam projection $g^3$, depending from the actuator, for impelling the breech-block and locking it when the trailing end of said dog passes from beneath or beyond the ends of the longitudinal ribs $a^2$ $a^2$ within and near the bottom of the side walls of the receiver, as shown in section in Fig. 12, so as to be rocked on its pivot to bring its trailing end into contact with the stop or abutment formed at the ends of said interior ribs $a^2$, and thereby lock the breech-block in firing position. When thus locked, the projection $g^4$ on the actuator will be slightly in rear of the hammer-stem or firing-pin $m$ and the next instant will strike it and discharge the gun. The projection $g^3$ on the actuator, occupying the recess or cavity in the locking-dog L between the two upstanding lugs or projections thereon, will engage the rear lug as the actuator moves back and unlock the breech-block by depressing the trailing end thereof sufficiently to enable it to move back clear of or underneath the stop or ribs forming the abutment for the lock, in time to permit the breech-block to be moved back by contact of the depending projection $g^4$ on the actuator with the arm $m^2$ or other part of the breech-block. The breech-block may be provided with any of the ordinary means for extracting and ejecting empty shells as it approaches the end of its rearward movement.

The sighting device S may be of the form shown in my aforesaid application of September 12, 1900, or of any desired construction.

It is obvious that various changes may be made in the details of construction and arrangement of parts without departing from the spirit and scope of my invention, and I do not desire to be limited to the specific construction and arrangement described and shown; but

What I claim is—

1. In a machine-gun, a reciprocatory actuator and means for imparting a reciprocating movement thereto; said actuator carrying as integral parts thereof a part adapted to encounter the flange of a cartridge in the cartridge feed-belt and withdraw the cartridge therefrom when moving backward, a second part adapted to engage the breech-block lock and release the breech-block on the same movement, and a third part to engage an element on the breech-block and move the latter rearward the instant it is unlocked; said unlocking part adapted to engage another portion of the locking device and move the breech-block forward on the forward movement of the actuator, and said second engaging part adapted to engage the firing-pin and discharge the gun the instant the breech-block is locked in firing position, substantially as described.

2. In a machine-gun, the combination with a receiver, of a reciprocatory actuator and breech-block, the former having a limited movement independent of the latter and adapted to move the same in the direction of its own movement at the limit of its independent movement in either direction, and a locking device, comprising a stop or abutment within the receiver and a locking-dog on the breech-block adapted to be engaged by said abutment to lock the breech-block in firing position, said dog being pivotally secured between its ends to the breech-block and having a projection at each end lying in the path of movement of a part carried by the actuator for engagement therewith, together with said engaging element arranged between said projections so as to engage one projection when moving forward and thereby lock the breech-block in firing position, and to engage the other projection when moving backward and thereby release the breech-block on the return movement of the actuator.

3. In a machine-gun, the combination with a reciprocatory breech-block, an actuator arranged to reciprocate the same, of a bell-crank-shaped locking-dog pivoted to the breech-block, an abutment with which said dog engages to lock the breech-block when the latter is in closing position, and a projection on the actuator arranged between the members of said locking-dog and adapted to engage said members alternately, on forward and rearward movement of the actuator, thereby tilting the dog to lock and unlock the breech-block; substantially as described.

4. The actuator comprising a reciprocatory bar having a cylindrical extension at its forward end, and a terminal piston or plunger integral therewith adapted to fit a suitable piston-cylinder, means carried by the actuator for impelling the breech-block and locking the latter in firing position on its forward movement, and for unlocking the breech-block and impelling it rearwardly on the rearward movement of the actuator, together with means carried by the actuator adapted to withdraw a cartridge from the feed-belt when the actuator moves rearward and to impel the firing-pin when the actuator moves forward.

5. In combination with the receiver containing the breech mechanism, including a breech-block, a cartridge-depressing device and a reciprocatory actuator for imparting movement thereto, a passage-way within the receiver for conducting a cartridge extracted from the feed device into position to be inserted in the breech of the gun-barrel, one wall of said passage having a spring fitted thereon or thereto for maintaining the cartridge in proper position until it reaches the limit of its rearward movement.

6. In a machine-gun, a passage-way for a belt of cartridges, and a reciprocatory feed-slide for advancing said belt, and a feed-dog carried by said slide having a limited independent movement in the direction of the travel of the slide, a stud on the dog adapted to contact with the slide on forward travel so as to retain the dog in engagement with the cartridge, and a recess in said slide in which said stud recedes on backward travel to release the dog and permit it to slip back freely past the next cartridge; substantially as described.

7. In a machine-gun, a passage-way for a belt of cartridges, and a feed-slide for advancing said belt step by step, a pivoted feed-dog carried by said slide having a slidable pivot permitting a limited movement of the dog in the direction of travel of the slide, a stud on said dog adapted to contact with the slide on forward travel, and a recess in said slide in which said stud recedes on backward travel; substantially as and for the purpose described.

8. In a gas-operated machine-gun, the combination of a receiver, a water-jacket having an internal gas-conduit, and a barrel fitted in the front of the receiver and extending through coaxial openings in the gas-conduit and front of the jacket, said barrel having a lateral gas-exit port registering with the bore of the gas-conduit, annular grooves on the barrel in the openings in said gas-conduit and jacket, and packing-rings fitted in said grooves forming water-tight joints while permitting expansion and contraction of the barrel; substantially as described.

9. In a gas-operated machine-gun, the reciprocatory actuator and means integral therewith for actuating the breech-block and eed-slide and for extracting a cartridge from belt of cartridges when the actuator moves rearward, said actuator having a forward integral cylindrical extension and a reduced terminal portion forming a piston proper to fit a piston-cylinder communicating with a gas-conduit; substantially as described.

10. In a gas-operated machine-gun, the reciprocatory actuator having integral contacting portions thereon adapted to extract a cartridge from the cartridge-belt on its rearward movement, and impart movement to the breech-block on both its backward and forward movements; said actuator having a limited movement independently of the breech-block, and provided with a forward integral extension forming a piston or plunger adapted to fit a piston-cylinder communicating with a gas-conduit leading from a port in the gun-barrel; substantially as described.

11. In a gas-operated machine-gun, the receiver having a water-jacket secured thereto and an internal gas-conduit and piston-cylinder compounded integral with said water-jacket, said conduit communicating with a port in the gun-barrel, in combination with the reciprocatory actuator having a forward integral extension forming a piston or plunger working in said piston-cylinder; substantially as described.

12. The water-jacket formed with a recess to provide an outlet therefrom into the open air, the said recess dividing the conduit and piston-cylinder proper from the rearward extension of the cylinder which receives and guides a cylindrical extension of the actuator carrying said piston; substantially as described.

13. In an automatic rapid-fire gun, the combination with the receiver, barrel and gas-conduit communicating with the latter, of a reciprocatory actuator arranged above the barrel and having a plunger portion contained in the conduit, said actuator being rearwardly impelled by the gases of discharge and forwardly impelled by a spring, cartridge-feeding mechanism operated by the actuator and arranged above the breech of the barrel, means carried by the actuator for seizing a cartridge on rearward travel, means for inserting the cartridge in the breech of the barrel, a reciprocatory breech-block carrying a firing-pin and a trailing locking-dog, said actuator having a limited movement independent of the breech-block but impelling the same at the limit of its independent movement in either direction, a pendent lug on the actuator engaging said locking-dog to lock the breech-block in closing position but to release the same after firing, and a pendent lug on the actuator adapted to impel the firing-pin when the breech-block stands locked; substantially as described.

In testimony whereof I affix my signature in presence of two witnesses.

VICTOR P. DE KNIGHT.

Witnesses:
CHAS. E. RIORDAN,
OSGOOD H. DOWELL.